US007804796B2

(12) United States Patent
(10) Patent No.: US 7,804,796 B2
Walker et al.
(45) Date of Patent: Sep. 28, 2010

(54) METHOD AND SYSTEM FOR SENDING AND RECEIVING SATELLITE DIGITAL RADIO PROGRAMMING INFORMATION FOR MULTIPLE CHANNELS

(75) Inventors: Glenn A. Walker, Greentown, IN (US); Michael L. Hiatt, Jr., Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 930 days.

(21) Appl. No.: 11/459,415

(22) Filed: Jul. 24, 2006

(65) Prior Publication Data

US 2008/0019297 A1 Jan. 24, 2008

(51) Int. Cl.

| | |
|---|---|
| ***H04B 7/185*** | (2006.01) |
| *G01S 3/16* | (2006.01) |
| *H04B 7/204* | (2006.01) |
| *H04B 7/216* | (2006.01) |
| *H04B 7/212* | (2006.01) |
| *H04B 7/19* | (2006.01) |
| *H04B 7/14* | (2006.01) |

(52) U.S. Cl. ....................... 370/316; 342/380; 370/319; 370/320; 370/321; 455/13.1; 455/13.2; 455/15; 455/16

(58) Field of Classification Search ................. 370/316, 370/319, 320, 321; 455/3.02, 429, 13.1, 455/13.2, 13.3, 15, 16

See application file for complete search history.

(56) References Cited

U.S. PATENT DOCUMENTS

| | | | | |
|---|---|---|---|---|
| 6,442,385 | B1 * | 8/2002 | Marko | 455/427 |
| 6,798,791 | B1 * | 9/2004 | Riazi et al. | 370/515 |
| 2007/0133420 | A1 * | 6/2007 | Guven et al. | 370/238 |

OTHER PUBLICATIONS

Mody et al., Synchronization for MIMO OFDM Systems, School of Electrical and Computer Engineering, GIT, Atlanta, GA, published 2001 (IEEE).*

* cited by examiner

*Primary Examiner*—Nick Corsaro
*Assistant Examiner*—Manpreet S Matharu
(74) *Attorney, Agent, or Firm*—Jimmy L. Funke

(57) ABSTRACT

A method and system for communicating satellite digital radio program information for multiple satellite channels is provided. The method includes the steps of providing multiple satellite signals, and providing multiple data frames in each of the satellite signals. The method also includes the steps of providing frame synchronization symbols in each of the data frames, such that the frame synchronization symbols occurring in the satellite signals do not overlap in time with each other. The method also includes the steps of providing multiple data slots within each of the data frames, and providing satellite program information in at least one of the data slots in each data frame. The multiple data slots are positioned within each data frame relative to the frame synchronization symbol of that data frame, such that the data slots containing satellite program information in the multiple satellite signals do not overlap in time with each other.

18 Claims, 6 Drawing Sheets

METHOD AND SYSTEM FOR SENDING AND RECEIVING SATELLITE DIGITAL RADIO PROGRAMMING INFORMATION FOR MULTIPLE CHANNELS

TECHNICAL FIELD

The present invention relates generally to wirelessly sending and receiving information about programming provided by satellite signals, and more specifically, to wirelessly sending and receiving satellite programming information about programs carried by multiple satellite digital radio signals to multiple satellite digital radio receivers.

BACKGROUND OF THE INVENTION

Trucks, boats, automobiles and other vehicles are commonly equipped with various signal communication devices such as radios for receiving broadcast radio frequency (RF) signals, processing the RF signals, and broadcasting audio information to passengers. Satellite digital audio radio (SDAR) services have become increasingly popular, offering digital radio service covering large geographic areas, such as North America. Other geographic areas, such as Europe, are also beginning to offer SDAR services. These services typically receive uplinked programming which, in turn, is provided to subscriber RF receivers via satellites or terrestrial receivers. Each subscriber to the service generally possesses a digital radio having an RF receiver and one or more antennas for receiving the digital broadcast.

In satellite digital audio radio services systems, the radio RF receivers are generally configured to tune to certain frequencies, receive digital data signals at those frequencies, and decode the digital data signals, which typically include many channels of digital audio. In addition to broadcasting the encoded digital quality audio signals, the satellite service may also transmit data that may be used for various other applications. The broadcast signals may include advertising, information about warranty issues, information about the broadcast audio programs, and news, sports, and entertainment programming. Thus, the digital broadcasts may be employed for any of a number of satellite audio radio, satellite television, satellite Internet, and various other consumer services.

The broadcast signals typically take the form of multiple data streams that are transmitted at different frequencies. Each of the multiple data streams that are transmitted at different frequencies are broken into frames for transmitting data. FIG. 1 provides one example of a data stream 6 transmitted at a predetermined RF frequency in a conventional SDAR system. As shown, data stream 6 is broken up into multiple data frames 30 and burst synchronization symbols 34 that are used to provide an orderly, predictable pattern of data transmission that can be properly interpreted by receivers in the SDAR system. Each data frame 30 includes a frame synchronization symbol 32 that is transmitted at the beginning of each data frame 30 to identify to receivers the starting point of each data frame 30. Each data frame 30 is also shown including multiple data slots 36 in which transmitted data is located. As shown, each data slot 36 is identified by a slot identifier (slot 1, slot 2, . . . slot 104) that identifies the position of the specific data slot 36 relative to the frame synchronization symbol 32 in each data frame 30. Although FIG. 1 shows each frame synchronization symbol 32, burst synchronization symbol 34, and data slot 36 having bit lengths of 104, 48 and 6244, respectively, other bit lengths are possible.

In a typical system, data slots 36 are assigned to provide channels of information, such as, for example, audio channels. For example, slots 10 and 11 could be assigned to provide a music channel "A". In this example, subscribers who wish to listen to music channel "A" would select channel "A" on their receiver. The receiver would tune to the RF frequency on which data stream 6 is transmitted, and would decode the data present in slots 10 and 11 of each data frame 30 that is received to provide audio to the subscribers. It should be appreciated that the receiver is able to identify the location of slots 10 and 11 of data stream 6 by knowing the location of the frame synchronization symbol 32, and position of slots 10 and 11 of data stream 6 relative to the frame synchronization symbol 32.

As noted above, the SDAR system is typically configured to provide multiple streams of data at various frequencies, each stream of which can contain multiple channels of information. FIG. 2 generally illustrates a typical SDAR system having multiple data streams 6, also referred to individually as STREAM 1, STREAM 2, STREAM 3 AND STREAM 4. Each of the data streams 6 is transmitted at a different RF frequency. As shown in FIG. 2, the frame synchronization symbols 32 for each of the multiple streams 6 occur at the same time. As a result, the frames 30 of each of the multiple streams 6 are aligned in time with the other multiple streams 6, as are the data slots 1-104 in each of the multiple data streams 6. Although the data frames 30 and data slots 1-104 of each of the multiple data streams 6 is aligned, it should be appreciated that the content provided in corresponding data slots of different streams 6 can be different for each stream 6. For example, slots 26-27 of STREAM 1 could be a music channel "B", while slots 26-27 of STREAM 2 could be a "talk" channel "C." It should be noted that because the slots of streams 6 are aligned in time, it is not possible for a subscriber to simultaneously receive the content of music channel "B" of STREAM 1 and "talk" channel "C" of STREAM 2. By providing multiple content channels in the various streams 6, the variety of content provided to subscribers is increased. Channel directory information, including information about future and current channel content, can be useful to communicate to users what is available on the various system channels.

What is needed is a method for transmitting and receiving SDAR channel directory information for multiple SDAR data streams that minimizes the system bandwidth required while reducing the amount of time needed to receive complete directory information in system receivers.

SUMMARY OF THE INVENTION

In accordance with one aspect of the present invention, a system for sending and receiving satellite channel information is provided. The system includes a transmitter configured to transmit multiple RF satellite signals at different frequencies. The RF satellite signals include multiple data frames including frame synchronization symbols. The frame synchronization symbols occur at different times in the multiple RF satellite signals. Data slots in the data frames are positioned in the frames relative to the frame synchronization symbols. The system also includes satellite channel information located in a designated data slot in the data frames. The designated data slot is positioned within each data frames such that said designated slot in each of said multiple RF satellite signals occurs at different times in each of the multiple RF satellite signals. The system also includes a receiver configured to receive multiple RF satellite signals and monitor designated data slots to extract satellite channel information.

In accordance with another aspect of the present invention, a method for sending and receiving satellite channel information is provided. The method includes the step of providing at least first and second RF satellite signals at first and second RF frequencies, respectively. The method also includes the steps of providing multiple data frames in each of the at least first and second RF satellite signals, and providing frame synchronization symbols within the multiple data frames such that the frame synchronization symbols of the at least first RF satellite signal are offset in time from the frame synchronization symbols of the at least second RF satellite signal. The method further includes the step of providing data slots within the multiple data frames that are positioned within each data frame relative to the frame synchronization symbol of the data frame in which the multiple data frames are located. The method still further includes the step of providing satellite channel information in at least one designated data slot of each data frame, such that the slots containing satellite channel information in the at least first RF satellite signal are offset in time from the slots containing satellite channel information in the at least second RF satellite signal.

In accordance with yet another aspect of the present invention, a method for sending and receiving satellite channel program information is provided. The method includes the step of providing at least four RF satellite signals, each at its own RF frequency, to multiple RF receivers. The method also includes the step of providing multiple, periodically repeating, data frames in each of the satellite signals. The method further includes the steps of providing frame synchronization symbols in each of the data frames of the satellite signals, such that the frame synchronization symbols in each of the satellite signals occur at a different time than the frame synchronization symbols of the other satellite signals.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 3:
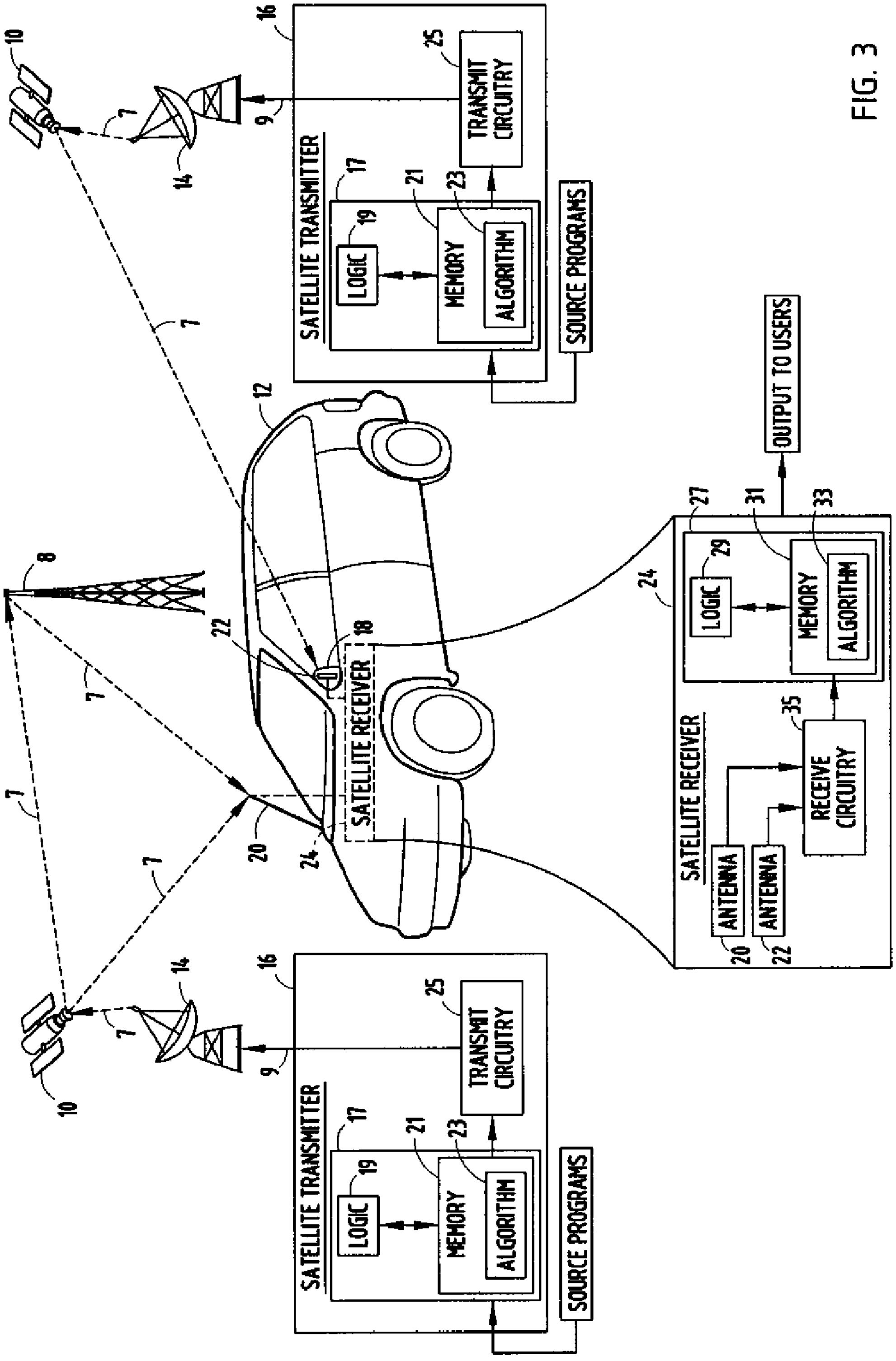
FIG. 3 is a general schematic diagram generally illustrating a satellite digital audio radio (SDAR) transmitting and receiving system, according to one embodiment of the present invention.

FIG. 3 generally illustrates a SDAR transmitting and receiving system, according to one embodiment of the present invention. Vehicle 12 is shown including multiple antennas 18 and 20 coupled to a satellite receiver 24. The satellite receiver 24 is configured to receive RF SDAR signals 7 at various frequencies from satellites 10 and/or a terrestrial repeater 8. As shown, RF SDAR signals are provided by satellite transmitters 16 to transmit antennas 14. Transmit antennas 14 then transmit RF SDAR signals 7 to satellites 10. In the present embodiment, the RF SDAR carrier frequencies used to transmit RF SDAR signals 7 from the transmit antennas 14 to the satellites 10 are different from the frequencies used to transmit the RF SDAR signals 7 from the satellites 10 to terrestrial repeater 8 and satellite receiver 24, and the frequencies used to transmit RF SDAR signals 7 from the satellites 10 are different from the frequencies used to transmit RF SDAR signals 7 from terrestrial repeater 8. In an alternate embodiment, the RF SDAR carrier frequencies used to transmit SDAR signals 7 from the transmit antennas 14 to the satellites 10 are the same frequencies used to transmit the RF SDAR signals 7 from the satellites 10 to terrestrial repeater 8 and satellite receiver 24, and the frequencies used to transmit RF SDAR signals 7 from the satellites 10 are the same as the frequencies used to transmit RF SDAR signals 7 from terrestrial repeater 8.

In the present embodiment, terrestrial repeater 8 employs forward error correction codes and a modulation scheme that are the same as those employed in satellites 10. In an alternate embodiment, forward error correction codes and modulation schemes employed by terrestrial repeater 8 are different than those employed by satellites 10. Although not specifically shown in FIG. 3, it should be appreciated that RF SDAR signals 7 include multiple data streams 40-43 generally illustrated in FIG. 4, that are transmitted at different frequencies. Each of the multiple data streams 40-43 of FIG. 4 that are transmitted at different frequencies are broken into frames for transmitting data.

As shown, the satellite transmitters 16 include processing circuitry 17 coupled to transmit circuitry 25. Processing circuitry 17 includes logic 19 coupled to memory 21, in which is stored a transmit algorithm 23. Processing circuitry 17 of transmitter 16 receives programming signals from an external source, executes the transmit algorithm 23 in logic 19 to format the programming signals for transmission, and provides the formatted signals to transmit circuitry 25 for transmission. Satellite transmitters 16 are configured to transmit the multiple data streams 40-43 of FIG. 4 with frame synchronization symbols 52, 62, 72, and 82 that occur in a non-overlapping manner, as discussed below. The satellite transmitters 16 are also configured to insert satellite channel information into designated data slots in streams 40-43 of FIG. 4 in the form of erasure codes (also discussed below). In the present embodiment, the transmitters 16 are configured in this manner by programming the memory 21 located in the transmitters 16, such that logic 19 formats the data streams 40-43 to have non-overlapping frame synchronization symbols 52, 62, 72 and 82, and such that channel information is inserted into designated data slots in the form of erasure codes. In an alternate embodiment, transmitters 16 are configured to operate in this manner by configuring logic and/or discrete circuit elements in the transmitter 16.

Satellite receiver 24 includes receiver circuitry 35 coupled to receive processing circuitry 27. Receiver circuitry 35 receives signals transmitted from transmitters 16, and provides the signals to receive processing circuitry 27 for decoding. Receive processing circuitry 27 includes logic 29 and memory 31 in which receive algorithm 33 is located. Logic 29 executes algorithm 33 to decode the signals received from receive circuitry 35, and provide output to users of satellite receiver 24. Satellite receiver 24 is configured to monitor non-overlapping, designated channels in streams 40-43 that contain satellite channel information in the form of erasure codes, and to extract satellite channel information from the monitored, non-overlapping channels, as discussed below. In the present embodiment, the satellite receiver 24 is configured in this manner by programming the memory 31 located in the satellite receiver 24, such that logic 29 monitors designated non-overlapping channels in streams 40-43, extracts the channel information in the form of erasure codes, and decodes the erasure codes to provide channel information. In an alternate embodiment, satellite receiver 24 is configured to operate in this manner by configuring logic and/or discrete circuit elements in the satellite receiver 24.

Figure 1:
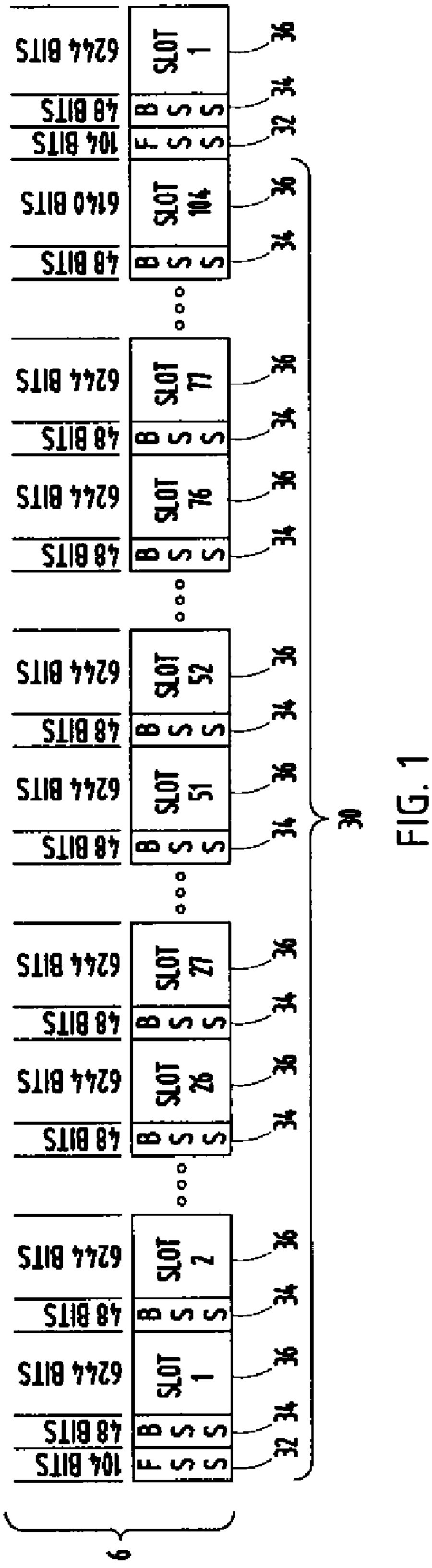
FIG. 1 PRIOR ART
FIG. 1 is a timing diagram generally illustrating a data stream and data frame in a typical SDAR system.
Figure 2:
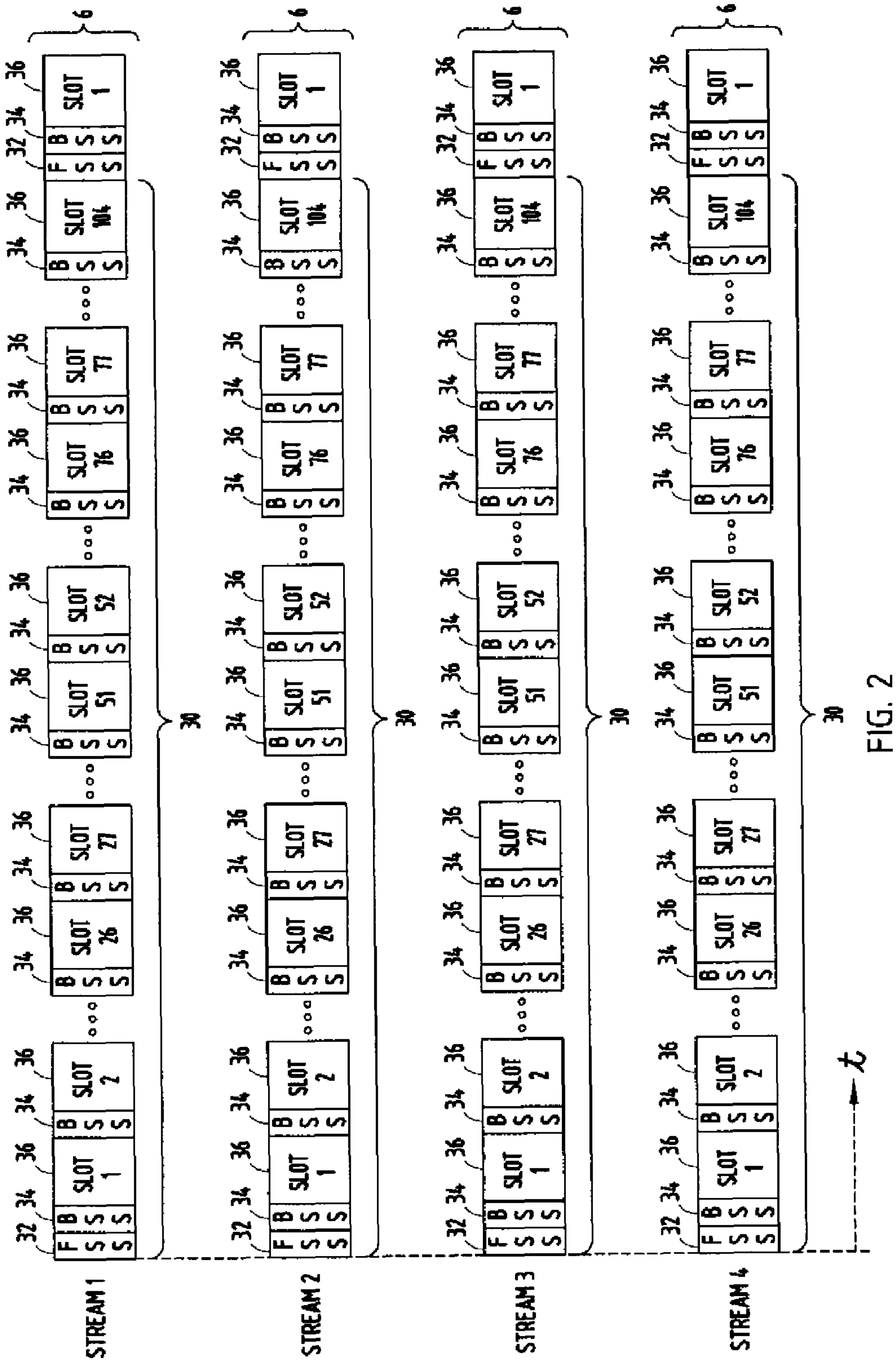
FIG. 2 PRIOR ART
FIG. 2 is a timing diagram generally illustrating multiple data streams and data frames in a typical SDAR system.
Figure 4:
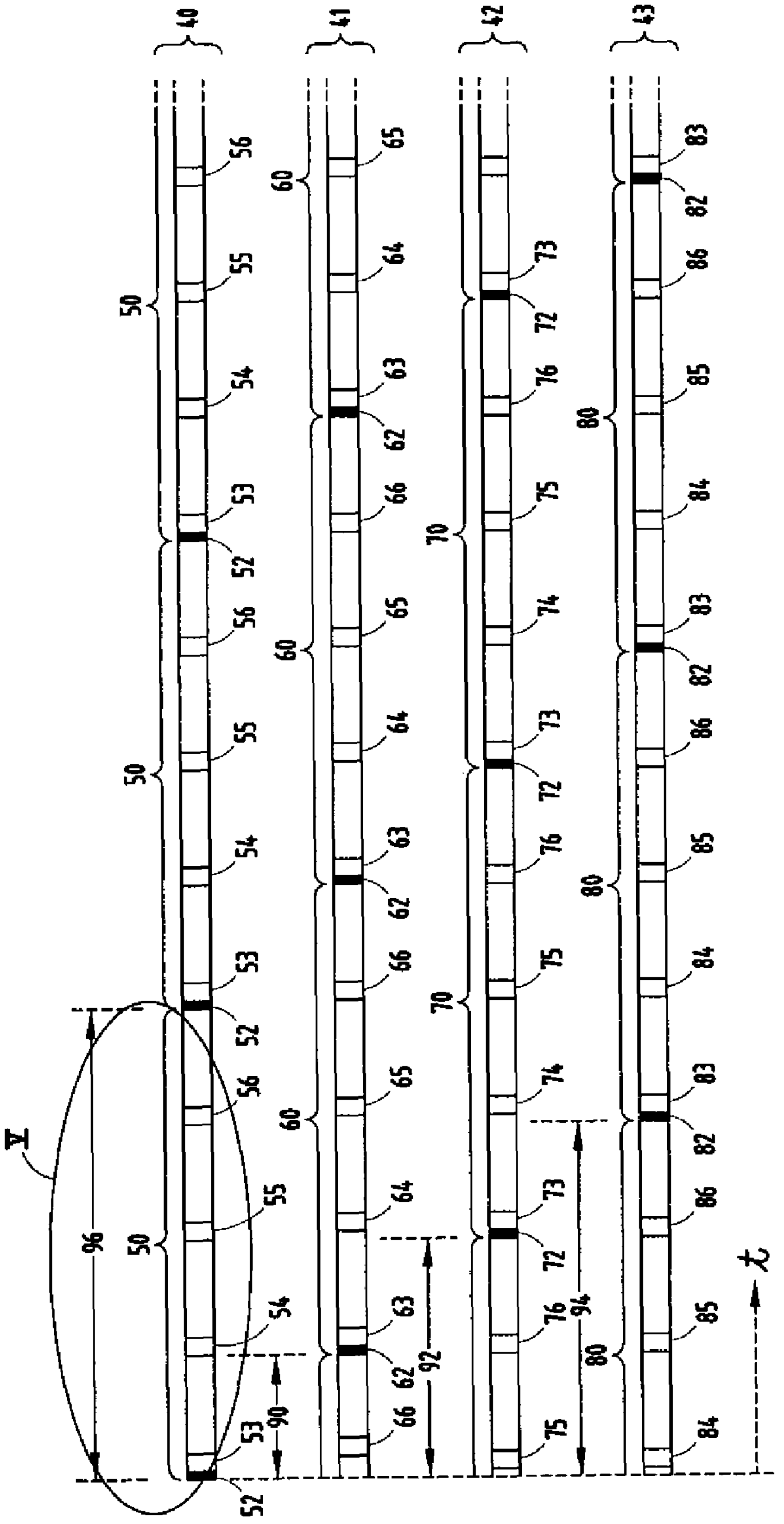
FIG. 4 is a timing diagram generally illustrating multiple data streams and data frames in a satellite transmitting and receiving system, according to one embodiment of the present invention.

FIG. 4 generally illustrates multiple data streams 40-43 provided according to the embodiment generally illustrated in FIG. 3. As shown, streams 40-43 each represent individual data streams provided by satellite transmitters. The streams are similar to those illustrated in FIGS. 1-2, with the exception that satellite transmitters of the present embodiment have been configured to create the data streams 40-43, as illustrated in FIG. 4, which are different from the streams generally illustrated in FIGS. 1-2. More specifically, the streams 40-43 generally illustrated in FIG. 4 include frame synchronization symbols 52, 62, 72 and 82 that are non-overlapping, while the frame synchronization symbols 32 of FIG. 2 are overlapping. Streams 40-43 also include satellite channel information in designated data slots of each stream in the form of erasure codes. These aspects of the present embodiment are discussed in greater detail below.

Referring to FIG. 4, each of data streams 40-43 is an RF satellite signal containing data, and having a frequency that is different than the other data streams generally illustrated in FIG. 4. In other words, the RF frequency of stream 40 is different from the RF frequencies of stream 41, stream 42, and stream 43; the RF frequency of stream 41 is different from the RF frequencies of stream 40, stream 42, and stream 43; the RF frequency of stream 42 is different from the RF frequencies of stream 40, stream 41, and stream 43; and the RF frequency of stream 43 is different from the RF frequencies of stream 40, stream 41, and stream 42. In the present embodiment, streams 40-43 are provided by multiple satellite transmitters. In an alternate embodiment, streams 40-43 are provided by the same satellite transmitter.

Figure 5:
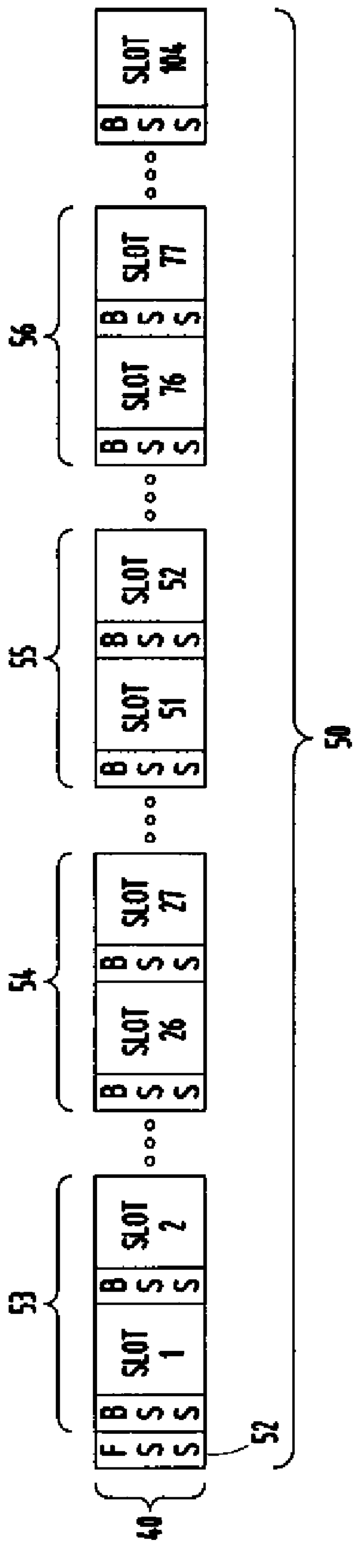
FIG. 5 is a close-up view of a portion of a data stream of FIG. 4.

As shown in FIG. 4, each of streams 40-43 includes multiple data frames 50, 60, 70, and 80, respectively. FIG. 5 provides additional detail of a data frame 50 of stream 40. Each data frame 50 includes a frame synchronization symbol 52 to indicate the beginning of the data frame. Each data frame 50 also includes multiple slots 1-104 configured to contain data to be decoded by receivers in the system. Each slot 1-104 is preceded by a burst synchronization slot. In the present embodiment, each frame synchronization symbol has a length of 104 bits, each burst synchronization symbol has a length of 48 bits, and each of slots 1-104 has a length of 6244 bits. In an alternate embodiment, the frame synchronization symbols, burst synchronization symbols and slots have other bit lengths. FIG. 5 also indicates slot groups 53, 54, 55, and 56, which refer to slots 1 and 2, 26 and 27, 51 and 52, and 76 and 77, respectively.

Returning to FIG. 4, stream 40 is made up of multiple successive data frames 50 transmitted one after the other. As noted above, each data slot 50 begins with a frame synchronization symbol, and includes slots 1-104 for transmitting data to be decoded by a receiver. FIG. 4 also illustrates the positioning of slot groups 53, 54, 55, and 56 within each data slot 50. As shown by item 96 of FIG. 4, the time period of one data frame 50 is equal to the amount of time between the beginning of a frame synchronization symbol 52 of one frame, and the beginning of the frame synchronization symbol 52 of the next frame transmitted in stream 40. It should be appreciated that streams 41, 42 and 43 have characteristics similar to stream 40, with the exception that the frame synchronization symbols 52, 62, 72, and 82 associated with data slots 50, 60, 70, and 80, respectively, of streams 40, 41, 42 and 43 are offset from each other, such that the frame synchronization symbol 52 of stream 40 does not overlap with the frame synchronization symbols 62, 72, and 82 of the other data streams 41, 42 and 43.

As can be seen in FIGS. 4 and 5, data slots 1-104 of each data frame are positioned within each frame relative to the frame synchronization symbols 52, 62, 72, and 82 that precedes each data frame 50, 60, 70, and 80 of streams 40, 41, 42 and 43. It should be appreciated that because frame synchronization symbols 52, 62, 72, and 82 are offset in time from each other in streams 40, 41, 42 and 43, the data slots within each data frame 50, 60, 70, and 80 will also be offset from each other. This can be seen by referring specifically to slot groups 53, 63, 73, and 83 of data slots 50, 60, 70, and 80 of streams 40, 41, 42 and 43, respectively. As shown in FIG. 5, slot group 53 encompasses slots 1 and 2 of data frame 50 of stream 40, slot group 63 includes slots 1 and 2 of data frame 60 of stream 41, slot group 73 includes slots 1 and 2 of data frame 70 of stream 42, and slot group 83 includes slots 1 and 2 of data frame 80 of stream 43.

Returning to FIG. 4, frame synchronization symbol 62 of stream 41 is shown offset from frame synchronization symbol 52 of stream 40 by a time illustrated as item 90, frame synchronization symbol 72 of stream 42 is offset from frame synchronization symbol 52 of stream 40 by a time illustrated by item 92, and frame synchronization symbol 82 of stream 43 is offset from frame synchronization 52 of slot 5 by a time equal to that illustrated by item 94. Because frame synchronization symbols 52, 62, 72, and 82 are offset in time, as illustrated in FIG. 4, it should be appreciated that slot groups 53, 63, 73, and 83, including slots 1 and 2 of data frames 50, 60, 70, and 80, are also offset in time from each other by the same amount of time by which the frame synchronization symbols 52, 62, 72, and 82 are offset from each other. As shown in FIG. 4, slot groups 53-56, 63-66, 73-76, and 83-86 all occur at different times due to the fact that the frame synchronization symbols, with reference to which they are located in each of data frames 50, 60, 70, and 80, are offset from each other in time.

In the present embodiment of the invention, slots 1 and 2 of each of data frames 50, 60, 70, and 80, referred to for convenience as slot groups 53, 63, 73, and 83, are configured by the transmitter in the system to include satellite channel information for data streams 40-43 of the system. Receivers in the system are configured to know that slots 1 and 2 of each of streams 40-43 contain satellite channel information. Receivers in the system are also configured to know the amount of time between frame synchronization symbols of the various streams, and therefore, the location of slots 1 and 2 in each of streams 40-43. Receivers in the system are configured to gather satellite channel information from slot groups 53, 63, 73, and 83 by changing frequencies during periods in which the receivers are not monitoring a given slot for other programming information. This allows the receivers to gather satellite channel information from slot groups 53, 63, 73, and 83 without negatively impacting the reception of desired programming information. Due to the offset nature of the frame synchronization symbols 52, 62, 72, and 82 of streams 40-43 and the offset of the slots 1-104 in each of streams 40-43, receivers in the system are configured to receive satellite channel information at least three times during each frame period 96.

For example, if a user of a receiver is monitoring program information that is being transmitted in slot group 54 of stream 40 (i.e., slots 26 and 27 of data frame 50 of stream 40), and wishes to obtain satellite channel information about programs being broadcast on other slots of stream 40, or other slots of streams 41, 42 and 43, the receiver is configured to switch, when it is not monitoring slot group 54, to other streams to receive and decode satellite channel information transmitted in slots 1 and 2 of those streams (i.e. slot groups 63, 73 and 83), as well as slot group 53 of stream 40. More specifically, after the receiver has received the data in slot group 54 in a given data frame 50, the receiver may switch to other frequencies (i.e., streams) to monitor various channels without impacting the programming being received in slot group 54. In the present example, the receiver, after receiving slot group 54 in a given data frame 50, switches to stream 42 to receive satellite channel information provided in slot group 73 of stream 42, switches to stream 43 to receive satellite channel information in slot group 83 being broadcast in stream 43, and switches back to stream 40 to receive satellite channel information being broadcast in slot group 53 of stream 40. The receiver then utilizes the information gathered from the slot groups 73, 83 and 53 containing the satellite channel information to decode the programming guide and provide satellite programming information to the user. It should be appreciated that the receiver is configured to switch to other frequencies and gather the satellite channel information, after which time it can switch back to the frequency and channel that it had previously been monitoring in time to receive the next data packet provided in that slot group (in this case, slot group 54). It should also be noted that the information in slot 63 of stream 41 has been lost due to the fact that the receiver is receiving slot 54 of stream 40 during that time.

The satellite channel information provided by the satellite transmitter in the slot groups 53, 63, 73, and 83 is provided using an erasure code. More specifically, in the present embodiment, the information is provided in the form of a digital fountain code that is programmed into each of the slot groups 53, 63, 73, and 83. The nature of erasure codes, and more specifically, digital fountain codes, is that a receiver can reconstruct a message sent using erasure codes in multiple packets, regardless of the order in which the multiple packets are received. Based on this, the receiver of the present embodiment can be configured to reconstruct the transmitted satellite channel information through streams 40, 41, 42 and 43 sent in slot groups 53, 63, 73, and 83, provided that it receives a sufficient number of packets, regardless of the order in which these packets were received. In the present embodiment, the transmitter is configured to divide the satellite programming information into erasure codes, and program those erasure codes into slot groups 53, 63, 73, and 83, such that a receiver receiving three or more slot groups, regardless of order, can reconstruct the transmitted satellite channel information. Therefore, in the previous example, even though slot 63 was lost, information received in slot groups 53, 73, and 83 is sufficient to reconstruct the transmitted satellite channel information.

As discussed above, by offsetting the frame synchronization symbols, and therefore the frames, of the separate streams 40-43, as generally illustrated in FIG. 4, satellite channel information may be time-sliced across multiple data slots in each of streams 40-43, such that a receiver can receive complete satellite channel information by receiving information in three slot groups, while continuing to monitor programming in a fourth slot group. By encoding the satellite channel information in the streams 40-43 in the form of erasure codes, receivers are able to decode the received erasure codes, and extract satellite channel information, regardless of the order in which the data in the designated channels is received. Although the present embodiment generally illustrates four independent streams 40-43, which are RF satellite signals each having a separate frequency, it should be appreciated that in an alternate embodiment, a greater or fewer number of streams may be employed. It should also be appreciated that in an alternate embodiment, each data frame could have more or fewer data slots than 104. In still another alternative embodiment, the transmitter and receiver could be configured to utilize erasure codes, such that greater or fewer number of slot groups are required to reconstruct satellite channel information to be provided to users.

Figure 6:
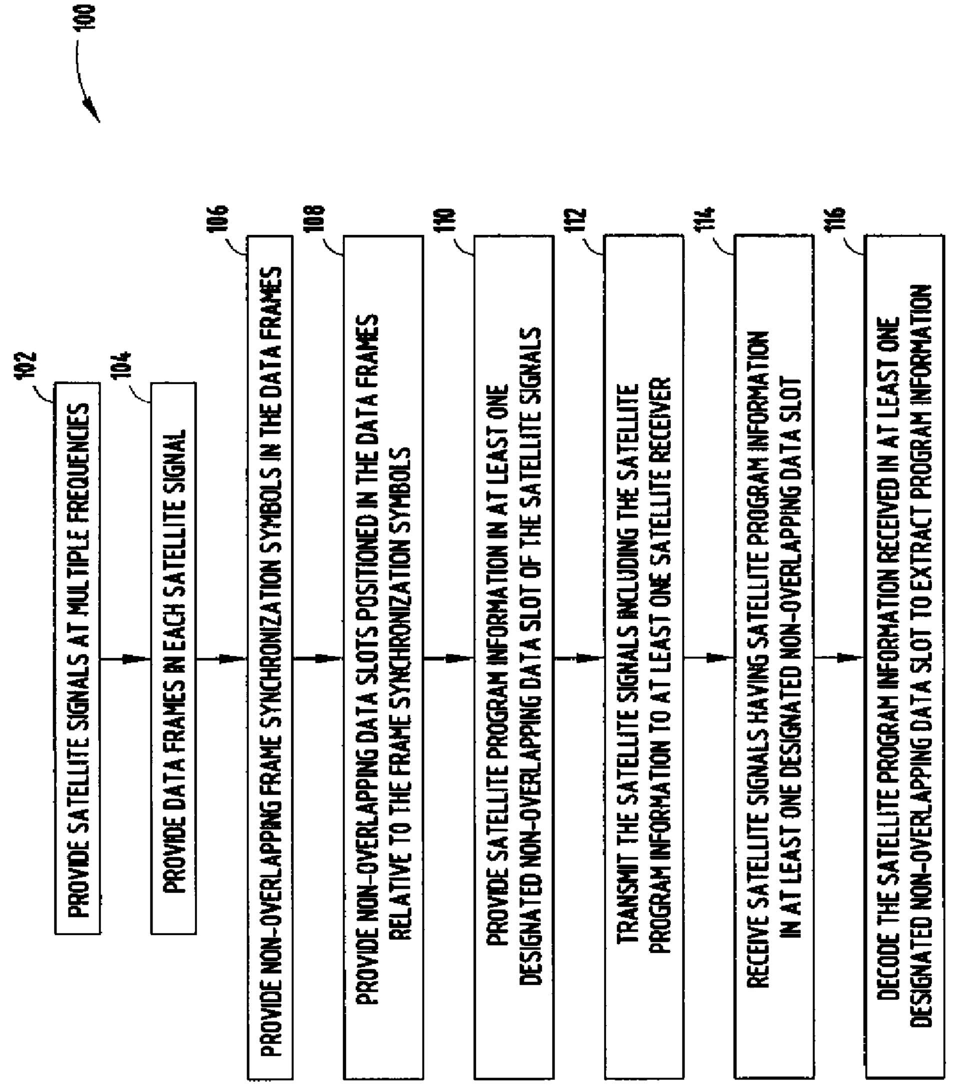
FIG. 6 is a flow diagram generally illustrating a method for sending and receiving satellite digital radio programming information, according to one embodiment of the present invention.

Referring to FIG. 6, a method 100 for sending and receiving satellite digital programming information is generally illustrated. In a first step 102 of the method 100, satellite signals are provided at multiple frequencies. In a second step 104 of the method 100, multiple data frames are provided in each of the satellite signals. In a third step 106 of the method 100, non-overlapping frame synchronization symbols are provided in each of the data frames. In a fourth step 108 of the method 100, non-overlapping data slots are provided and positioned in the data frames relative to the frame synchronization symbols. In a fifth step 110 of the method 100, satellite programming information is provided in at least one designated non-overlapping data slot of the satellite signals. In a sixth step 112 of the method 100, satellite signals having satellite program information included as erasure codes in at least one designated non-overlapping data slot are transmitted to at least one satellite receiver. In a seventh step 114 of the method 100, satellite signals having satellite program information included as erasure codes in at least one designated non-overlapping data slot of the satellite signals are received by a receiver. In an eighth step 116 of the method 100, the satellite programming information received in the at least one designated non-overlapping data slot is decoded to extract program information, and provide that information to users.

The above description is considered that of the preferred embodiments only. Modifications of the invention will occur to those skilled in the art, and to those who make or use the invention. Therefore, it is understood that the embodiments shown in the drawings and described above are merely for illustrative purposes, and not intended to limit the scope of the invention, which is defined by the following claims, as interpreted according to the principles of patent law, including the doctrine of equivalents.

The invention claimed is:

1. A system for transmitting and receiving satellite channel information, comprising:

a transmitter configured to generate multiple RF satellite signals at different frequencies, each of said multiple RF satellite signals comprising data frames comprising data slots and frame synchronization symbols, insert said frame synchronization symbols of said multiple RF satellite signals at different times, and position said data slots in said data frames relative to said frame synchronization symbols, wherein said satellite channel information is in the form of an erasure code and transmitted in multiple packets;

said transmitter configured to transmit said generated multiple RF satellite signals at different frequencies; and a receiver configured to receive said multiple RF satellite signals at different frequencies, monitor said designated slot in the received multiple RF satellite signals, extract satellite channel information from said monitored, designated slot, and transmit satellite channel information to users of said receiver, wherein said receiver reconstructs a message sent using said erasure code in said multiple packets regardless of an order in which said multiple packets are received.

2. A method for transmitting and receiving satellite channel information, comprising the steps of:

transmitting at least a first RF satellite signal at a first RF frequency and a second RF satellite signal at a second RF frequency;

transmitting multiple data frames in each of the first and second RF satellite signals;

transmitting frame synchronization symbols within the multiple data frames to indicate a reference position in the multiple data frames, the frame synchronization symbols of the first RF satellite signal being offset in time from the frame synchronization symbols of the second RF satellite signal, such that the frame synchronization symbols of the first RF satellite signal occur at a different time than the frame synchronization symbols of the second RF satellite signal;

transmitting data slots within the multiple data frames that are positioned within the multiple data frames of the first and second RF satellite signals relative to the frame synchronization symbols of the first and second RF satellite signals in which they occur;

transmitting satellite channel information in at least one designated data slot of the multiple data frames of the first RF satellite signal and second RF satellite signal, such that the at least one designated data slot containing channel information in the first RF satellite signal occurs at a different time than the at least one designated data slot containing channel information in the second RF satellite signal, wherein the satellite channel information transmitted in the at least one designated slot is in the form of an erasure code and transmitted in multiple data packets, such that a receiver can reconstruct a message sent using said erasure code in said multiple packets regardless of an order in which said multiple packets are received; and transmitting the first and second RF satellite signals containing the satellite channel information to at least one satellite receiver.

3. The method of claim 2, wherein the satellite channel information is provided in at least two designated data slots immediately following the frame synchronization symbols in the multiple data frames.

4. The method of claim 2, wherein the at least one designated data slot is the same slot relative to the frame synchronization symbols in each of the multiple data frames of the first and second RF satellite signals.

5. The method of claim 2, wherein the erasure code comprises a digital fountain code.

6. The method of claim 2, further comprising the steps of receiving satellite channel information in a designated data slot of a data frame of the first RF satellite signal at the first RF frequency, switching to the second RF frequency, and receiving satellite channel information in a designated data slot of a data frame of the second RF signal at the second RF frequency, wherein the reception of the satellite channel information at the first and second RF frequencies occurs within a time period of one data frame, and wherein a time period of one data frame is equal to a time period between frame synchronization symbols of data frames of at least one of the first RF satellite signal and second RF satellite signal.

7. The method of claim 6, further comprising the step of processing the received satellite channel information to extract information about the content being broadcast in multiple data frames of the first and second RF satellite signals.

8. The method of claim 7, further comprising the step of providing the at least one RF receiver with information as to the location of the designated channels relative to frame synchronization symbols.

9. The method of claim 8, further comprising the step of programming memory associated with the at least one RF receiver to configure the at least one RF receiver to obtain satellite channel information from multiple frequencies.

10. The method of claim 2, wherein the satellite channel information comprises information transmitted by multiple satellites.

11. The method of claim 2, wherein the duration of the offset between frame synchronization symbols of the multiple data streams in different RF satellite signals is approximately equal to 1 divided by the number of RF satellite signals provided, times the period of time between frame synchronization symbols in multiple data frames of one of the provided RF satellite signals.

12. A method for transmitting and receiving satellite channel program information, comprising the steps of:

transmitting at least four RF satellite signals, each at its own RF frequency;

transmitting multiple, periodically repeating, data frames in each of the RF satellite signals, each data frame including multiple data slots configured to contain data;

transmitting frame synchronization symbols in each of the multiple, periodically repeating data frames of the at least four satellite signals to indicate the beginning position of each frame, wherein the frame synchronization symbols of the multiple, periodically repeating data frames of each of the four satellite signals are offset in time from the frame synchronization symbols of the multiple, periodically repeating data frames of each of the remaining RF satellite signals, such that the frame synchronization symbols of each of the RF satellite signals occur at a different time than the frame synchronization symbols of the remaining RF satellite signals;

transmitting satellite channel information in information data slots immediately following the frame synchronization symbol of each of the multiple data frames of each of the at least four RF satellite signals, such that the information data slots in each of the at least four RF satellite signals occur in non-overlapping timeslots, wherein the satellite channel information provided in the at least one designated slot is in the form of an erasure code and transmitted in multiple data packets, such that a receiver can reconstruct a message sent using said erasure code in said multiple packets regardless of an order in which said multiple packets are received; and transmitting the at least four satellite signals including the offset frame synchronization symbols to at least one RF satellite receiver.

13. The method of claim 12, wherein the multiple data slots within each the multiple data frames are positioned within each data frame relative to the frame synchronization symbol of that data frame.

14. The method of claim 12, further comprising the step of altering a receive RF frequency of the at least one RF receiver multiple times while the at least one RF receiver is receiving RF satellite signals, such that the at least one RF receiver receives satellite channel information in each of the information data slots of each of the at least four RF satellite signals.

15. The method of claim 14, wherein the satellite channel information in each of the information data slots of each of the at least four RF satellite signals is received in the at least one RF satellite receiver during a period represented by the amount of time between successive frame synchronization symbols in one of the at least four RF satellite signals received.

16. The method of claim 14, further comprising the step of processing the satellite channel information received in each of the information data slots of each of the at least four RF satellite signals to extract satellite programming information.

17. The method of claim 12, wherein the multiple data slots of the data frames are separated by burst synchronization symbols.

18. The method of claim 12, wherein the at least four RF satellite signals are provided in a format that is compatible with an ONDAS™ satellite transmission protocol.

* * * * *